United States Patent [19]
Chang

[11] 4,179,181
[45] Dec. 18, 1979

[54] INFRARED REFLECTING ARTICLES

[75] Inventor: Leei Chang, Woodstock, Conn.

[73] Assignee: American Optical Corporation, Southbridge, Mass.

[21] Appl. No.: 892,585

[22] Filed: Apr. 3, 1978

[51] Int. Cl.² ............... G02B 5/28; B05D 5/06; B05D 1/36
[52] U.S. Cl. .................. 350/1.7; 350/166; 427/160
[58] Field of Search .......... 427/160; 350/164, 166, 350/1.7

[56] References Cited
U.S. PATENT DOCUMENTS

| | | | |
|---|---|---|---|
| 3,682,528 | 8/1972 | Apfel et al. | 427/160 X |
| 3,846,152 | 11/1974 | Franz | 427/160 X |
| 3,990,784 | 11/1976 | Gelber | 350/166 |

*Primary Examiner*—James R. Hoffman
*Attorney, Agent, or Firm*—Jeremiah J. Duggan; Alan H. Spencer; Stephen A. Schneeberger

[57] ABSTRACT

Articles having an interference coating which reflects infrared energy are disclosed. The coating has a period of three layers in which the first and third layers are a refractory dielectric material and the intermediate, or second layer, is silver. If the period is repeated once, the cut-off between transmission and reflection is sharper than the coating having a single period.

15 Claims, 2 Drawing Figures

INFRARED REFLECTING ARTICLES

BACKGROUND OF THE INVENTION

The present invention relates to infrared reflecting articles and more particularly to interference coatings which reflect infrared energy.

Infrared reflective coatings are generally known. However, the prior art reflective coatings are either expensive because of the materials used or because many layers are required to obtain the necessary transmission-reflection cut-off. The most common single-layer infrared-reflecting coating is gold. Gold is undesirable as a single layer coating for two reasons. The first reason is the high cost and the second reason is that gold also reflects a large amount of the yellow-red portion of the visible spectrum. Therefore, articles having a gold, single-layer, infrared-reflecting coating transmit little of the visible spectrum. Multi-layer, band-pass filters are efficient and flexible in meeting design requirements of a sharp cut-off point and good transmission in the visible range with low transmission in the infrared range. However, the multi-layer band pass filters of the prior art usually require 20 to 30 layers in the coating and neither the band-width of transmitted light or the band-width of reflected light is very wide. Spurious leaks are also a problem with prior art multi-layer, interference films as well as the difficulty of manufacture and expense associated with producing many superimposed coatings.

BRIEF DESCRIPTION OF THE PRESENT INVENTION AND SUMMARY OF THE DRAWINGS

The present invention relates to an interference coating for reflecting infrared light and selectively transmitting visible light. The infrared coating has a period of three layers. The first and last layers of the period are a refractory dielectric material. The intermediate, or second coating, is silver metal. When a sharp cut-off between reflected and transmitted light is desired, the period may be doubled to give a total of six layers in the interference coating. Some plastics may require an intermediate layer of SiO or $SiO_2$ on top of the substrate to prove suitable bonding of the refractory dielectric to the substrate. Also for some articles such as ophthalmic lenses, welding goggles and the like, it may be desirable to have an abrasion- resistant coating on the final or top-most coating of the interference coating.

FIG. 1 is a diagrammatical representation of the preferred embodiment according to the present invention, and FIG. 2 is a graph showing representative transitions from transmission to reflection according to the present invention.

DETAILED DESCRIPTION OF THE PRESENT INVENTION

Figure 1:
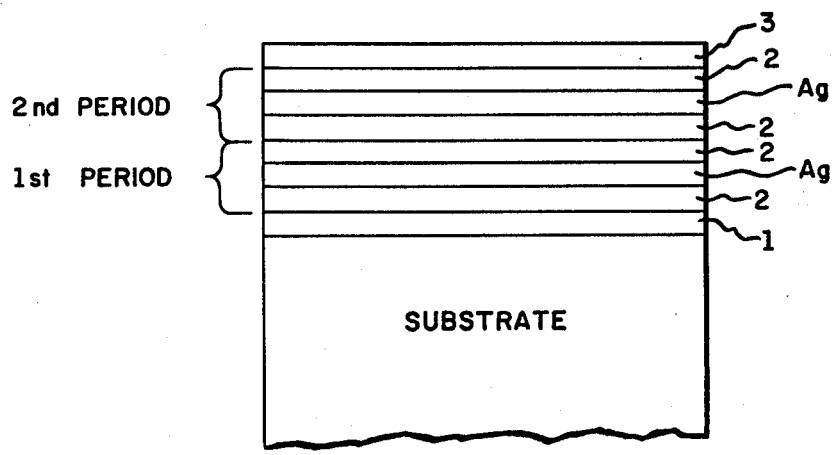

Referring to FIG. 1 a substrate has an infrafred reflecting interference coating with first and second periods. While substrates are usually transparent, opaque substrates such as metal and opaque plastics are also suitable. Transparent, clear or dyed substrates which may be used include polycarbonate resins, poly(allyl diglycol carbonate); polymethylmetharcylate; and glass. The substrate may be in form of sheet, an ophthalmic lens, a safety lens, small plates, such as those used in welding helmets and solar reflectors. When synthetic resin substrates are used, it is usually desirable to coat the substrate with a thin layer of SiO to promote adhesion of the refractory dielectric if the dielectric material is not $SiO_x$. The adhesion promoting layer 1 is shown in FIG. 1 and when optionally used is applied in a thickness of about 5 Å. The silver layer of each period is sandwiched between a pair of refractory dielectric layers 2. Some suitable refractory dielectric materials are $TiO_2$, $CeO_2$, $ZrO_2$, $Nd_2O_3$, MgO, $Al_2O_3$, and $SiO_x$ where x is from 1 to 2, and perferrably about 1.5. Frequently it is desirable to protect the final layer of the refractory dielectric with an abrasion-resistant coating 3. The abrasion-resistant coating is an optional coating which does not form a part of the present invention. One example of a suitable abrasion-resistant coating is that taught by U.S. Pat. No. 3,986,997 issued to Clark. When $SiO_x$ is used as the refractory dielectric, it is convenient to use $SiO_2$ as the abrasion-resistant coating. Abrasion-resistant coatings are usually in the order of 4 to 10 microns thick. Although not shown in FIG. 1, the band of $A_g$ layer to a $SiO_x$ dielectric layer may be improved by an intermediate layer of palladium metal about 5 Å thick.

Figure 2:
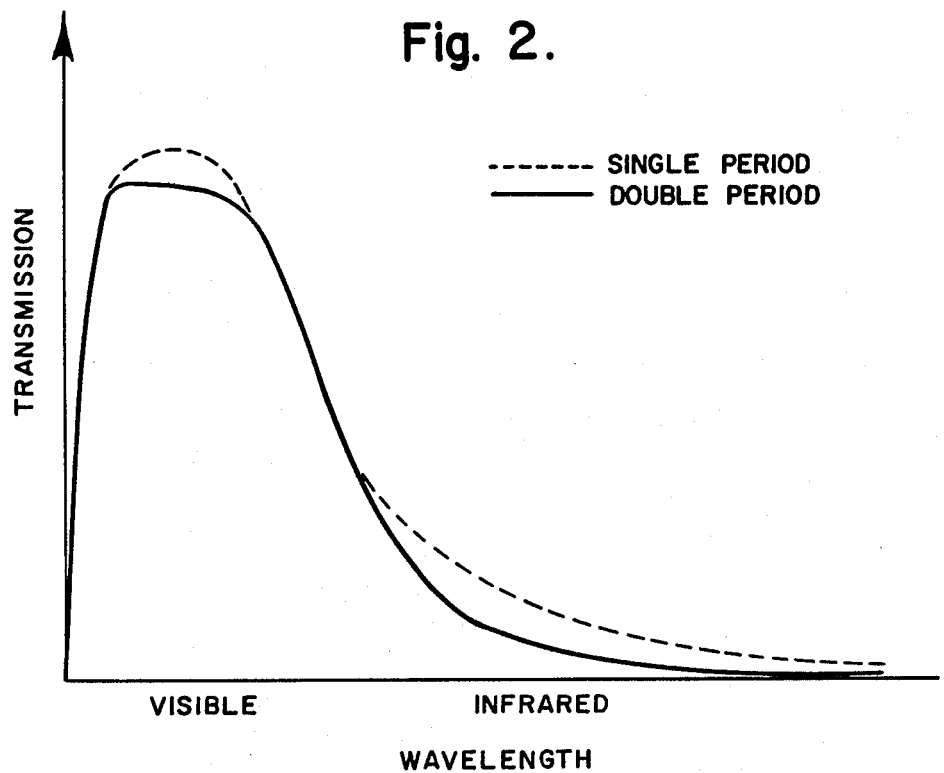

FIG. 2 illustrates the more rapid cut-off provided when a two period interference coating is used. Referring to FIG. 2 the solid line shows the high transmission in the visible range with very low transmission in the infrared range for two-period coating. The transmission properties of a single period interference coating are represented by the curve having the dotted line which has substantially the same cut-off point but is less efficient in reflecting infrared energy than is a two-period interference coating.

EXAMPLE I

Using an electron beam evaporator in a chamber evacuated to $9 \times 10^{-6}$ Torr, $Ti_2O_3$ was deposited on a polycarbonate lens at room temperature using an $O_2$ partial pressure of $7 \times 10^{-5}$. After the $Ti_1O_2$ deposit reached a thickness of 160 Å, the beam was turned off and residual $O_2$ was removed from the chamber. An Ag source was then evaporated at room temperature until an Ag deposit of 180 Å was obtained. $O_2$ was reintroduced into the chamber and a second $Ti_1O_2$ layer was deposited on the Ag layer also having a thickness of 160 Å. The transmission (T) and reflection (R) properties of the coated lens are shown in Table I. In preparing the interference coatings of the invention, temperatures significantly above room temperature adversely affect the transmission of visible wavelengths and should be avoided.

EXAMPLE II

A polycarbonate lens was treated at room temperature to provide a two period coating following the procedure of Example I by repeating each deposition to obtain a six layer coating with each layer having the same thickness as the respective layer in Example I. This lens had a sharper as shown by the transmission values in Table I.

EXAMPLE III

A polycarbonate lens was coated with single period and a lens with double period coatings using $ZrO_2$ as the refractory dielectric material by conventional vapor deposition procedures at room temperature. The refractory dielectric layer thicknesses were each 250 Å thick and the silver layers were each 110 Å thick. The transmission (T) and reflectance (R) values at various wavelengths (2) are given in Table I.

EXAMPLE IV

Two polycarbonate lenses were coated uing conventional, room-temperature, vapor deposition procedures and one lens had a single period coating and one a double period coating. The $SiO_{1.5}$ layers each had a thickness of 200 Å and the silver thickness of each layer was 130 Å, the transmission (T) and reflectance (R) values at various wavelengths are given in Table I.

5. The article according to claim 4 wherein the surface of (a) is coating with SiO.
6. The article of claim 4 wherein the surfaces of (b) and (c) are coated with palladium before coating with (c) and (d) respectively.
7. The article according to claim 4 further including a final coating of an abrasion-resistant material.
8. The article according to claim 10 wherein each (b) and (d) layer is about 180 Å thick.
9. The article according to claim 1 wherein said substrate is glass and the refractory dielectric has an index of refraction at least 1.6.

TABLE I

| | EXAMPLE I | | EXAMPLE II | | EXAMPLE III | | | | EXAMPLE IV | | | |
| | Single Period | | Double Period | | Single Period | | Double Period | | Single Period | | Double Period | |
| (um) | T | R | T | R | T | R | T | R | T | R | T | R |
|---|---|---|---|---|---|---|---|---|---|---|---|---|
| 0.38 | | | | | 0.57 | 0.16 | 0.64 | 0.03 | 0.525 | 0.03 | 0.48 | 0.01 |
| 0.40 | 0.82 | 0.04 | 0.66 | 0.055 | 0.67 | 0.14 | 0.71 | 0.03 | 0.645 | 0.03 | 0.56 | 0.03 |
| 0.45 | 0.825 | 0.03 | 0.665 | 0.025 | 0.78 | 0.09 | 0.735 | 0.045 | 0.755 | 0.05 | 0.67 | 0.06 |
| 0.50 | 0.805 | 0.075 | 0.0675 | 0.05 | 0.83 | 0.07 | 0.735 | 0.06 | 0.75 | 0.10 | 0.69 | 0.05 |
| 0.55 | 0.72 | 0.16 | 0.545 | 0.225 | 0.85 | 0.05 | 0.735 | 0.06 | 0.69 | 0.175 | 0.67 | 0.05 |
| 0.60 | 0.615 | 0.265 | 0.36 | 0.435 | 0.85 | 0.05 | 0.74 | 0.045 | 0.615 | 0.26 | 0.56 | 0.14 |
| 0.65 | 0.52 | 0.365 | 0.235 | 0.59 | 0.85 | 0.06 | 0.735 | 0.04 | 0.55 | 0.345 | 0.41 | 0.30 |
| 0.70 | 0.43 | 0.46 | 0.155 | 0.71 | 0.82 | 0.09 | 0.67 | 0.085 | 0.475 | 0.43 | 0.28 | 0.47 |
| 0.75 | 0.36 | 0.53 | 0.11 | 0.77 | 0.78 | 0.12 | 0.56 | 0.185 | 0.475 | 0.495 | 0.19 | 0.58 |
| 0.80 | 0.33 | | 0.09 | | | | | | | | | |
| 0.85 | 0.29 | | 0.07 | | | | | | | | | |
| 0.90 | 0.245 | | 0.055 | | | | | | | | | |
| 0.95 | 0.215 | | 0.045 | | | | | | | | | |
| 1.00 | 0.19 | | 0.035 | | 0.54 | | | | | | | |
| 1.10 | 0.15 | | 0.025 | | | | | | | | | |
| 1.20 | 0.12 | | 0.02 | | | | | | | | | |
| 1.30 | 0.10 | | 0.015 | | | | | | | | | |
| 1.40 | 0.085 | | 0.015 | | | | | | | | | |
| 1.50 | 0.075 | | 0.015 | | 0.22 | | | | | | | |
| 1.60 | 0.065 | | 0.01 | | | | | | | | | |
| 1.70 | 0.055 | | 0.01 | | | | | | | | | |
| 1.80 | 0.05 | | 0.01 | | | | | | | | | |
| 1.90 | 0.045 | | 0.01 | | | | | | | | | |
| 2.00 | 0.04 | | 0.005 | | 0.09 | | | | | | | |

What is claimed is:

1. An interference-coated, infrared reflecting article comprising, in sequence,
   (a) a substrate having a surface,
   (b) a first layer of a refractory dielectric,
   (c) a layer of silver having a thickness between about 110 and 250 Å,
   (d) a second layer of the refractory dielectric.

2. The article according to claim 1 wherein (b), (c) and (d) are repeated in sequence.

3. The article according to claim 2 wherein (b) and (d) are $SiO_x$.

4. The article according to claim 2 wherein (a) is a synthetic resin, selected from the group consisting of polycarbonate, poly (allyl diglycol carbonate), and polymethyl methacrylate, (b) and (d) are a material selected from the group consisting of SiO, $SiO_{1.5}$, $SiO_2$ and mixtures thereof and have a thickness of about 110 to about 250 Å, and (b), (c) and (d) are repeated once to provide the order (a) (b) (c) (d) (b) (c) (d).

10. The article in claim 1 wherein said substrate is a transparent plastic having a layer of SiO on the surface and the refractory dielectric has an index of refraction of at least 1.6.

11. The article according to claim 1 wherein said dielectric is selected from the group consisting of $TiO_2$, $CeO_2$, $ZrO_2$, $Nd_2O_3$, MgO, $Al_2O_3$ and $SiO_x$ where x is 1 to 2.

12. The article according to claim 1 wherein (c) is about 140 to about 220 Å thick.

13. The article according to claim 1 further including a final coating of an abrasion resistant material.

14. The article according to claim 1 further including an adhesion promoting material under one of the layers.

15. A method of treating a substrate to cause it to reflect infrared light which comprises,
   (1) coating the substrate with a refractory dielectric material,
   (2) coating the material of step 1 with about 110 to about 250 Å of silver, and
   (3) coating the silver of step 2 with the refractory dielectric of 1.

* * * * *